US008763832B2

(12) United States Patent
Yeh et al.

(10) Patent No.: US 8,763,832 B2
(45) Date of Patent: Jul. 1, 2014

(54) HOUSING FOR AN ELECTRONIC DEVICE

(75) Inventors: Chih-Feng Yeh, Taipei Hsien (TW); Tien-Chung Tseng, Taipei Hsien (TW)

(73) Assignee: Wistron Corporation, Hsichih, Taipei Hsien (TW)

( * ) Notice: Subject to any disclaimer, the term of this patent is extended or adjusted under 35 U.S.C. 154(b) by 1299 days.

(21) Appl. No.: 12/570,500

(22) Filed: Sep. 30, 2009

(65) Prior Publication Data
US 2010/0085691 A1 Apr. 8, 2010

(30) Foreign Application Priority Data

Oct. 2, 2008 (TW) ................................ 97217657 U (51) Int. Cl.
*B65D 43/12* (2006.01)
*B65D 43/08* (2006.01)

(52) U.S. Cl.
USPC ...................... 220/4.02; 220/345.2; 220/345.6

(58) Field of Classification Search
USPC .................. 220/4.02, 4.21, 345.2, 351, 345.6
See application file for complete search history.

(56) References Cited

U.S. PATENT DOCUMENTS

| 988,116 | A | * | 3/1911 | Lee et al. ....................... 215/322 |
| 3,126,444 | A | * | 3/1964 | Taylor ............................ 174/101 |
| 3,352,446 | A | * | 11/1967 | Anderson et al. .............. 220/232 |
| 4,126,224 | A | * | 11/1978 | Laauwe et al. ................ 206/540 |
| 4,342,403 | A | * | 8/1982 | Badtke et al. ................. 220/350 |
| 5,405,034 | A | * | 4/1995 | Mittel, Jr. ...................... 215/322 |
| 6,711,859 | B2 | * | 3/2004 | Bell et al. ........................ 49/501 |
| 7,178,674 | B2 | * | 2/2007 | Krumme ....................... 206/555 |
| 7,798,355 | B2 | * | 9/2010 | Geisen et al. .............. 220/254.9 |
| 8,047,397 | B2 | * | 11/2011 | Mittet ........................... 220/751 |
| 2007/0007287 | A1 | * | 1/2007 | Seo et al. ..................... 220/4.21 |
| 2008/0251512 | A1 | * | 10/2008 | Griffin et al. ................ 220/4.02 |

* cited by examiner

*Primary Examiner* — Mickey Yu
*Assistant Examiner* — Niki Eloshway
(74) *Attorney, Agent, or Firm* — Foley & Lardner LLP; Andrew S. Baluch (57) ABSTRACT

A housing for an electronic device includes a housing body and a cover. The housing body includes a base wall and a first surrounding wall projecting from the base wall. The first surrounding wall has an end face that is a first inclined surface of a surrounding shape. The cover covers the housing body, and includes a cover plate and a second surrounding wall projecting from the cover plate. The second surrounding wall has an end face that is a second inclined surface of a surrounding shape in tight engagement with the first inclined surface so that the second surrounding wall and the first surrounding wall cooperatively define an airtight space. At least one of the first and second surrounding walls is a water-proof component made of an elastic material.

15 Claims, 7 Drawing Sheets

HOUSING FOR AN ELECTRONIC DEVICE

CROSS-REFERENCE TO RELATED APPLICATION

This application claims priority of Taiwanese Application No. 097217657, filed on Oct. 2, 2008.

BACKGROUND OF THE INVENTION

1. Field of the Invention

The invention relates to a housing for an electronic device, more particularly to a water-proof structure for a battery cover of a housing of an electronic device.

2. Description of the Related Art

Referring to FIGS. 1, 2, 3, and 4, a conventional mobile phone housing 1 includes a housing body 11, a battery cover 12 removably assembled to the housing body 11, and a locking member 13 for locking the battery cover 12 to the housing body 11. The housing body 11 has a rear sidewall 111 with a layer of water-proof rubber 112 adhered thereto. The rear sidewall 111 of the housing body 11 and the water-proof rubber 112 cooperatively define a receiving recess 113 for receiving two batteries 2, and a through hole 114 that is located upwardly of the receiving recess 113 for extension of the locking member 13 therethrough. The water-proof rubber 112 of the housing body 11 defines two engaging grooves 115 that are located downwardly of the receiving recess 113. The battery cover 12 includes a passage hole 121 for extension of the locking member 13 therethrough and corresponding to the through hole 114 in position, and two engaging hooks 122 for engaging the engaging grooves 115, respectively.

Figure 1:
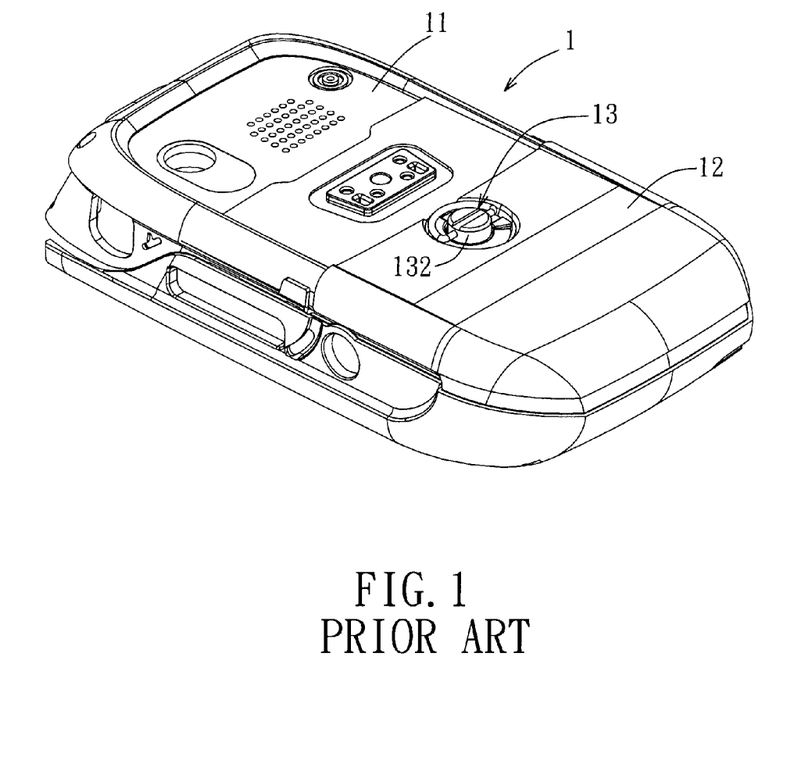
FIG. 1 is a perspective view of a conventional mobile phone housing.
Figure 2:
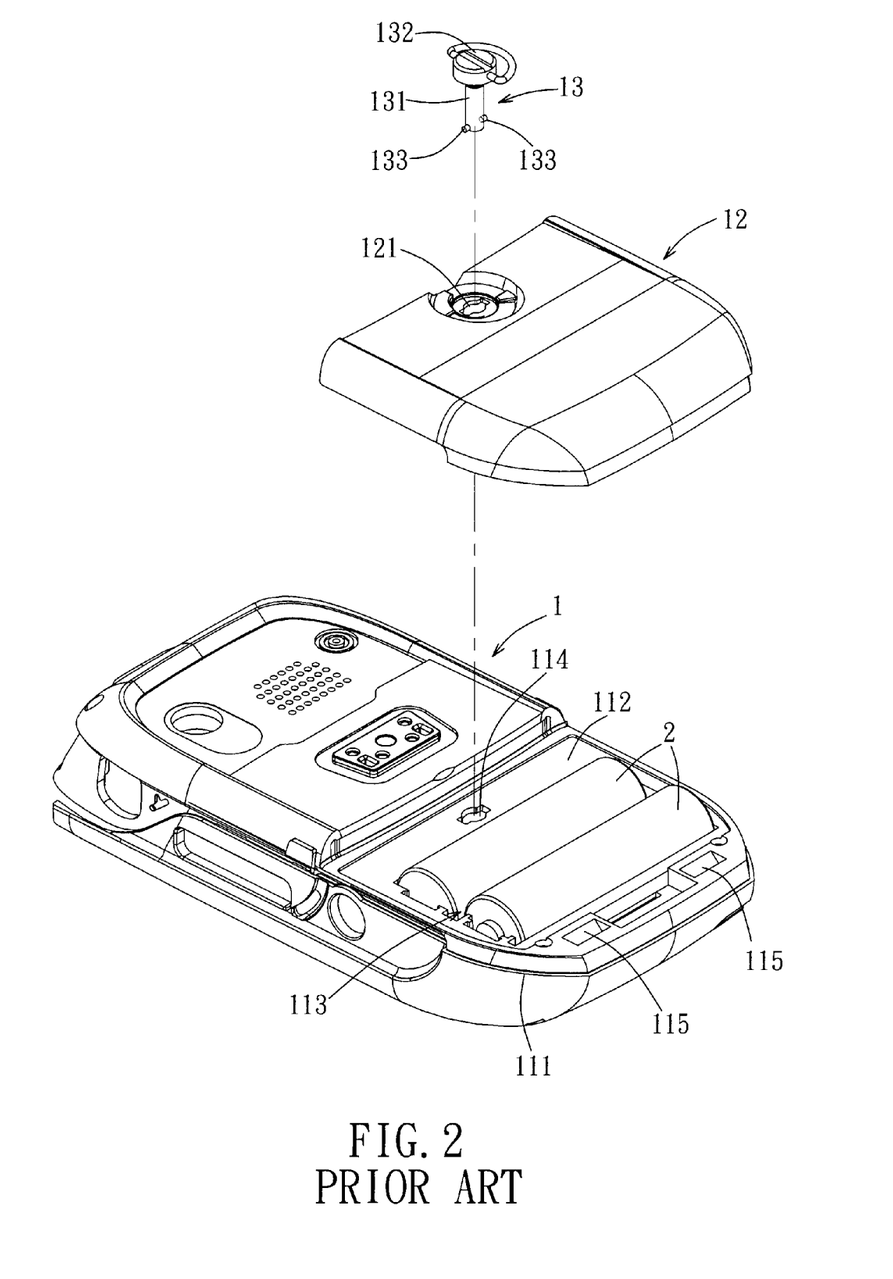
FIG. 2 is an exploded perspective view of the conventional mobile phone housing.
Figure 3:
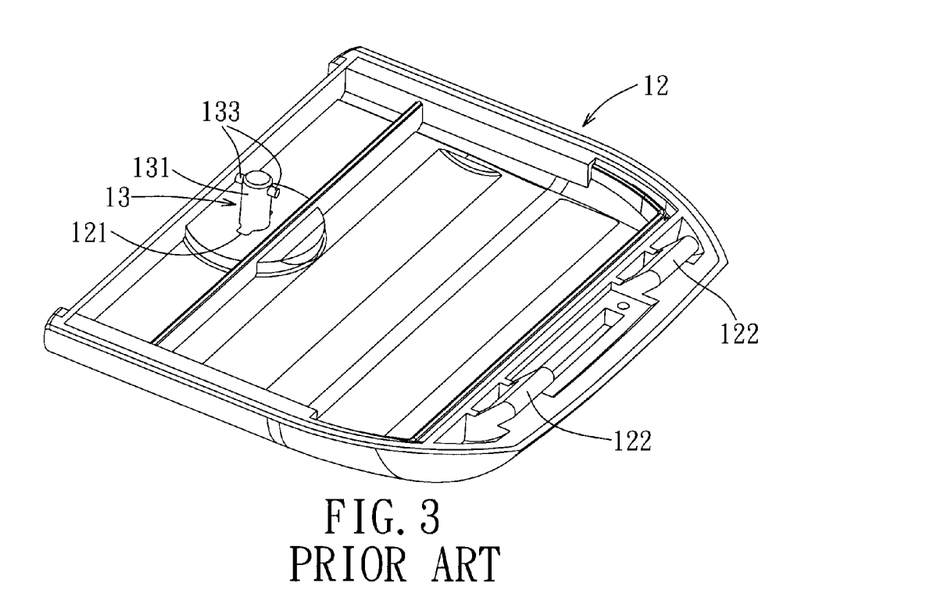
FIG. 3 is a perspective view of a battery cover of the conventional mobile phone housing.
Figure 4:
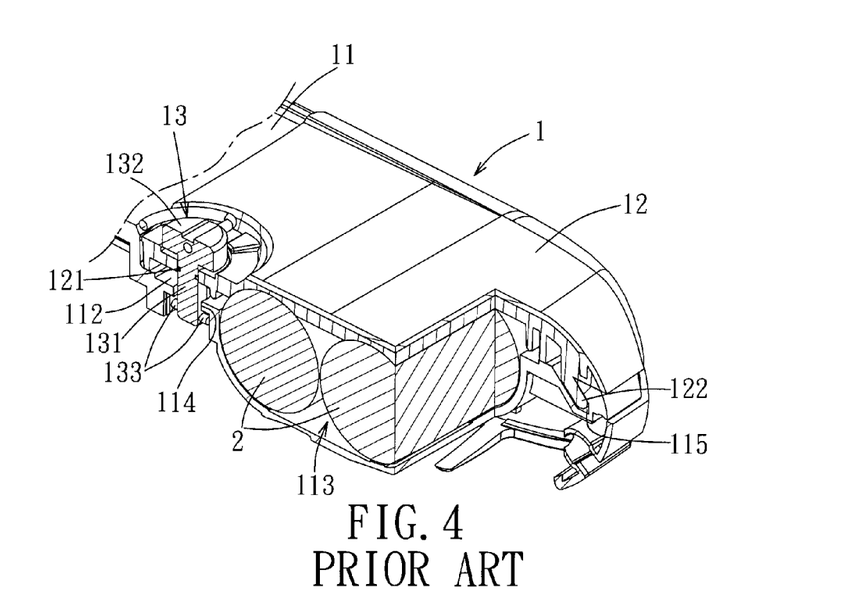
FIG. 4 is a fragmentary partly sectional perspective view of FIG. 1.

When it is desired to assemble the battery cover 12 to the housing body 11, the two engaging hooks 122 of the battery cover 12 are first brought to engage the two engaging grooves 115 in the water-proof rubber 112, and the battery cover 12 is disposed on the water-proof rubber 112. Subsequently, a post 131 of the locking member 13 is extended through the passage hole 121 in the battery cover 12 and the through hole 114 in the housing body 11. Thereafter, an operating portion 132 of the locking member 13 is rotated such that two engaging portions 133 on an outer surface of the post 131 engage an inner surface of the water-proof rubber 112, thereby completing assembly of the battery cover 12.

Since the manner of assembling the battery cover 12 involves use of the engaging hooks 122 located downwardly thereof and the locking member 13 located upwardly of the engaging hooks 122 for locking purpose, pressure will be applied to upper and lower portions of the water-proof rubber 112. After a number of assembly and disassembly operations of the battery cover 12, the pressing forces applied to the upper and lower portions of the water-proof rubber 112 may cause a middle portion of the water-proof rubber 112 to bulge, which may result in water leakage. Furthermore, with such a configuration of the water-proof rubber 112, the battery cover 12 can only be fitted directly to the housing body 11, and cannot be designed to be coupled slidably thereto. This is because a friction force will be generated between the battery cover 12 and the water-proof rubber 112 during the sliding of the battery cover 12, so that the battery cover 12 can not be slid easily or can not be slid at all. Therefore, the manner of coupling the battery cover 12 to the housing body 11 is subject to many limitations.

SUMMARY OF THE INVENTION

An object of the present invention is to provide a housing for an electronic device, in which a cover can be slidingly assembled to a housing body to achieve a water-proof effect by virtue of the configuration of a first surrounding wall having a first inclined surface and a second surrounding wall having a second inclined surface.

Another object of the present invention is to provide a housing for an electronic device, in which a first inclined surface of a first surrounding wall and a second inclined surface of a second surrounding wall can be tightly engaged with each other to attain a good water-proof effect by virtue of the configurations of engaging grooves in a housing body, engaging hooks of a cover, and a locking member.

The aforesaid objects of the present invention and solutions to technical problems associated therewith are realized using the technical means described hereinbelow. The housing for an electronic device according to this invention includes a housing body and a cover.

The housing body includes a base wall and a first surrounding wall projecting from the base wall. The first surrounding wall has an end face that is a first inclined surface of a surrounding shape. The cover covers the housing body, and includes a cover plate and a second surrounding wall projecting from the cover plate. The second surrounding wall has an end face that is a second inclined surface of a surround shape in tight engagement with the first inclined surface so that the second surrounding wall and the first surrounding wall cooperatively define an airtight space. At least one of the first and second surrounding walls is a water-proof component made of an elastic material.

The object of the present invention and the solutions to the technical problems associated therewith may be further realized using the following technical means.

In the housing for an electronic device, the cover is slidable relative to the housing body along an assembling direction so as to be coupled to the housing body such that the second inclined surface and the first inclined surface are tightly engaged with each other.

In the housing for an electronic device, the base wall has a first end and a second end opposite to the first end. The first inclined surface extends slantingly from a point proximate to the first end to a point proximate to the second end to be gradually away from the base wall. The cover plate has a first end and a second end respectively corresponding in position to the first end and the second end of the base wall. The second inclined surface extends slantingly from a point proximate to the second end of the cover plate to a point proximate to the first end of the cover plate to be gradually away from the cover plate. The cover is slidable from the first end of the base wall toward the second end of the base wall along the assembling direction so as to be coupled to the housing body such that the second inclined surface and the first inclined surface are tightly engaged with each other.

In the housing for an electronic device, the first and second surrounding walls can be configured in three ways. In one configuration, the first surrounding wall is a water-proof component, and is made of a material of rubber, silicone, thermoplastic elastomer, or thermosetting elastomer. In another configuration, the second surrounding wall is a water-proof component, and is made of a material of rubber, silicone, thermoplastic elastomer, or thermosetting elastomer. In still another configuration, both of the first and second surrounding walls are water-proof components, and are made of a material of rubber, silicone, thermoplastic elastomer, or thermosetting elastomer. Therefore, a good water-proof effect can be attained.

In the housing for an electronic device, the housing body further includes a plurality of engaging grooves disposed in an outer periphery of the first surrounding wall. The cover further includes a plurality of engaging hooks disposed at an outer periphery of the second surrounding wall for engaging the engaging grooves, respectively. Therefore, the first inclined surface of the first surrounding wall and the second inclined surface of the second surrounding wall are tightly engaged with each other.

In the housing for an electronic device, each of the engaging grooves is elongate in shape, and includes an alignment groove portion proximate to the first end of the base wall for aligning with a corresponding one of the engaging hooks, and a retaining groove portion proximate to the second end of the base wall for retaining the corresponding one of the engaging hooks such that the cover can be assembled to the housing body through a sliding engagement.

In the housing for an electronic device, the housing body further includes a through hole. The cover further includes a passage hole corresponding in position to the through hole. The housing for an electronic device further comprises a locking member extending through the through hole and the passage hole so as to lock the cover to the housing body.

In the housing for an electronic device, by virtue of the configurations of the first inclined surface of the first surrounding wall and the second inclined surface of the second surrounding wall, and by virtue of the arrangements of the engaging grooves in the outer periphery of the first surrounding wall, the engaging hooks at the outer periphery of the second surrounding wall, and the locking member, the cover can be assembled to the housing body through a sliding engagement. Furthermore, the first inclined surface of the first surrounding wall and the second inclined surface of the second surrounding wall can be tightly engaged with each other to attain a good water-proof effect.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

The aforesaid and other technical contents, features, and advantages of the present invention will become apparent in the following detailed description of a preferred embodiment with reference to the accompanying drawings. Through the following detailed description of the preferred embodiment, the technical means adopted to achieve the intended objects and advantageous effects of the present invention should be better understood. However, the accompanying drawings are provided for reference and illustration only and should not be based upon to limit the scope of protection sought for the present invention.

Before the present invention is described in greater detail, it should be noted that like elements are denoted by the same reference numerals throughout the disclosure.

Figure 5:
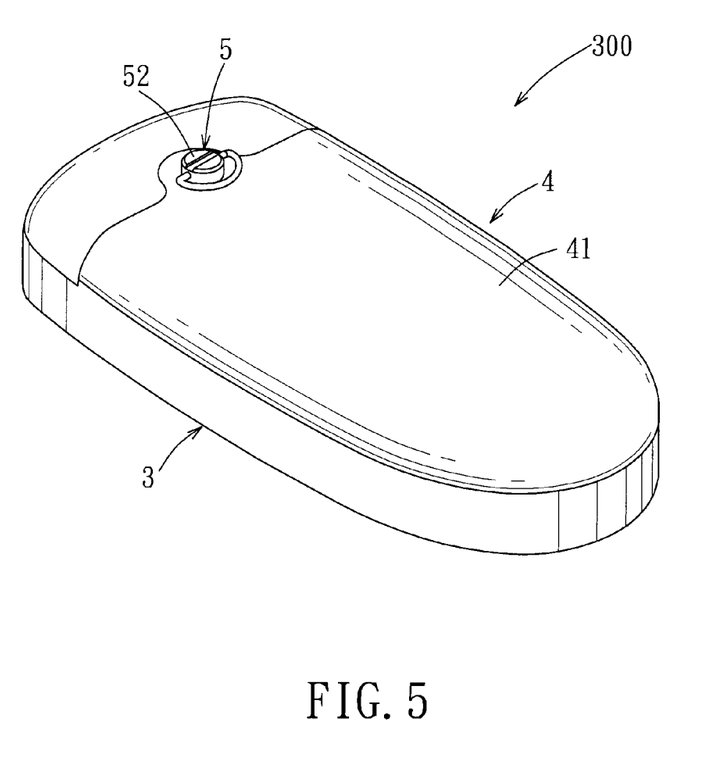
FIG. 5 is a perspective view of a preferred embodiment of a housing for an electronic device according to this invention.
Figure 6:
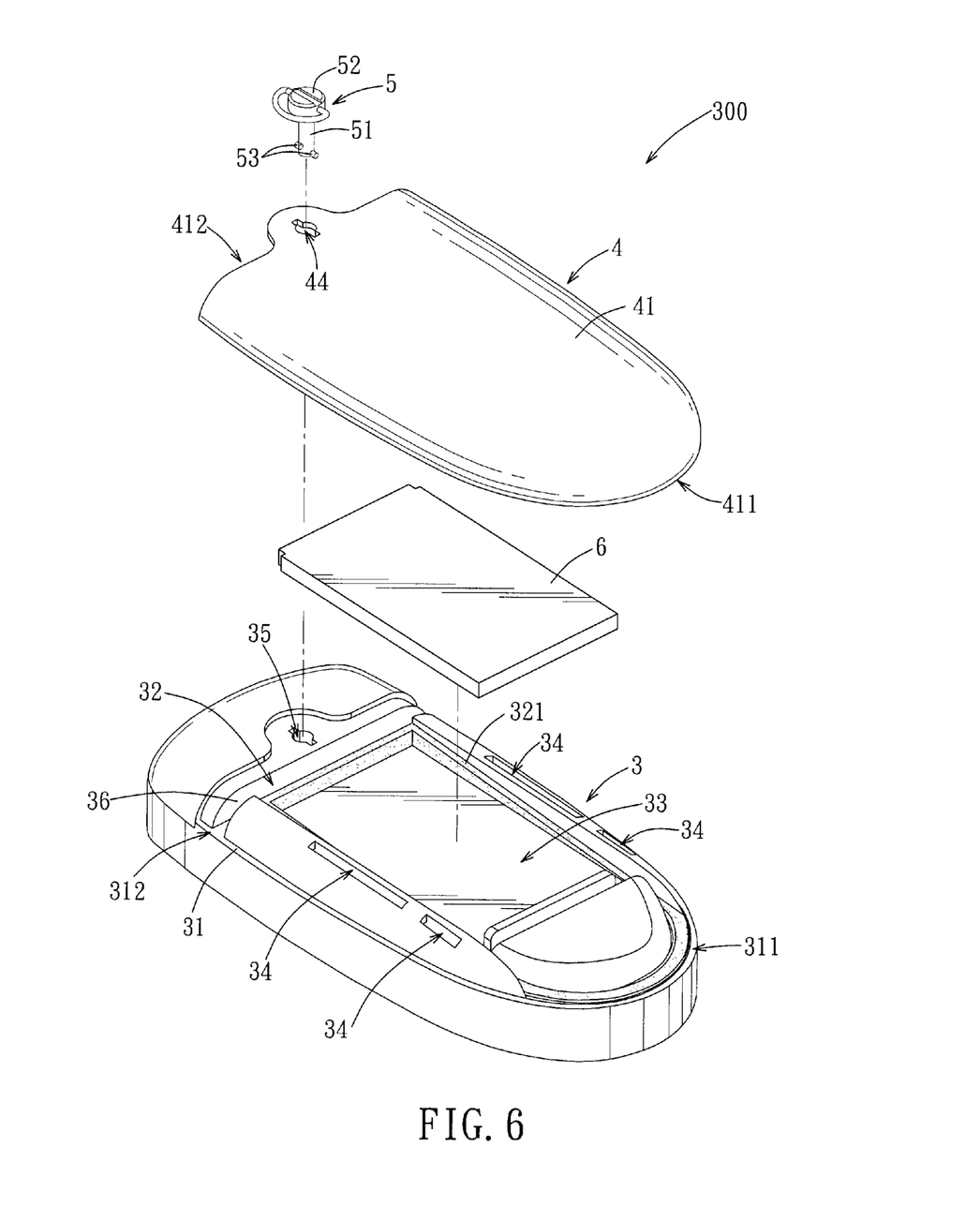
FIG. 6 is an exploded perspective view of the preferred embodiment of the housing for an electronic device according to this invention.

Referring to FIGS. 5 and 6, the preferred embodiment of a housing 300 for an electronic device according to this invention is shown. The electronic device is a mobile phone. Certainly, the electronic device can be any other hand-held type electronic device, such as a personal digital assistant (PDA), a global positioning system, a digital music player, or a digital camera. The housing 300 of the electronic device includes a housing body 3, a cover 4 covering the housing body 3, and a locking member 5 for locking the cover 4 to the housing body 3.

Figure 7:
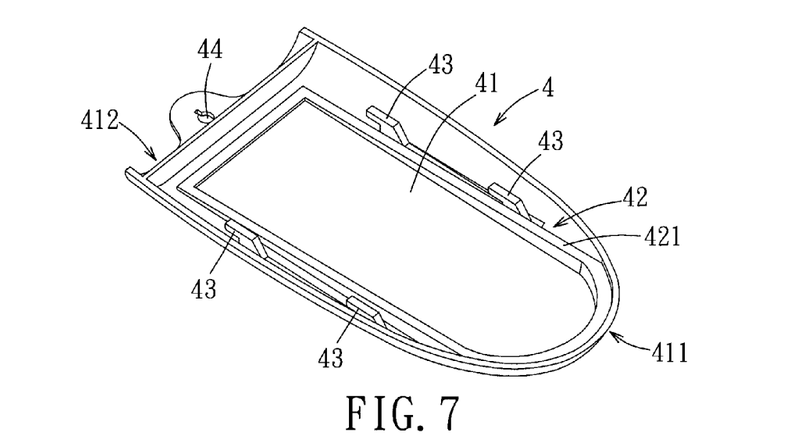
FIG. 7 is a perspective view of a cover of the preferred embodiment of the housing for an electronic device according to this invention.
Figure 9:
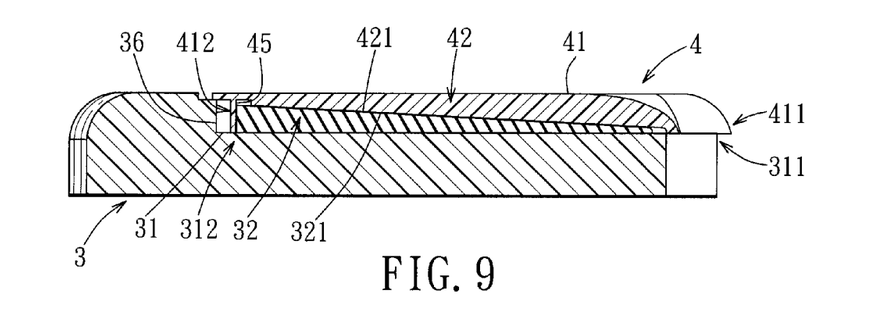
FIG. 9 is a schematic sectional view of the preferred embodiment of the housing for an electronic device according to this invention, illustrating a portion of a second inclined surface of a second surrounding wall in contact with a first inclined surface of a first surrounding wall.

Referring to FIGS. 6, 7, and 9, the housing body 3 includes a base wall 31 at a back portion thereof. The base wall 31 has a first end 311 located at a bottom side thereof, and a second end 312 disposed proximate to a top side thereof. A first surrounding wall 32 projects from the base wall 31 of the housing body 3 between the first end 311 and the second end 312. An end face of the first surrounding wall 32 is a first inclined surface 321 of a surrounding shape. The first inclined surface 321 extends slantingly from a point proximate to the first end 311 to a point proximate to the second end 312 to be gradually away from the base wall 31, so that the thickness between the first inclined surface 321 and the base wall 31 proximate to the first end 311 is smaller than that between the first inclined surface 321 and the base wall 31 proximate to the second end 312. In this embodiment, the first surrounding wall 32 is a water-proof component made of an elastic rubber material. The first surrounding wall 32 may also be a material such as silicone, thermoplastic elastomer (TPE), or thermosetting elastomer. The first surrounding wall 32 may be adhered to the base wall 31 of the housing body 3 using glue. The inclination angle of the first inclined surface 321 of the first surrounding wall 32 is about 3 degrees. Certainly, the inclination angle is not limited by the disclosure of this embodiment, and can be varied depending on practical requirements.

The cover 4 includes a cover plate 41. The cover plate 41 has a first end 411 located on a bottom side thereof and corresponding in position to the first end 311 of the housing body 3, and a second end 412 located on a top side thereof and corresponding in position to the second end 312 of the housing body 3. The cover plate 41 has an inner surface which is integrally formed with a second surrounding wall 42. The second surrounding wall 42 has an end face that is a second inclined surface 421 of a surrounding shape to be tightly engaged with the first inclined surface 321. The second inclined surface 421 extends slantingly from a point proximate to the second end 412 to a point proximate to the first end 411 to be gradually away from the inner surface of the cover plate 41, so that the thickness between the second inclined surface 421 and the inner surface of the cover plate 41 proximate to the second end 412 is smaller than that between the second inclined surface 421 and the inner surface of the cover plate 41 proximate to the first end 411.

The housing body 3 further includes a plurality of engaging grooves 34 disposed respectively in left and right sides of an outer periphery of the first surrounding wall 32. Each of the engaging grooves 34 is elongate in shape and extends in the same longitudinal direction as the housing body 3. The cover 4 further includes a plurality of engaging hooks 43 projecting from the inner surface of the cover plate 41 and disposed at left and right sides of an outer periphery of the second surrounding wall 42. Each of the engaging hooks 43 is disposed to engage a respective one of the engaging grooves 34 so as to secure the cover 4 onto the housing body 3.

Figure 8:
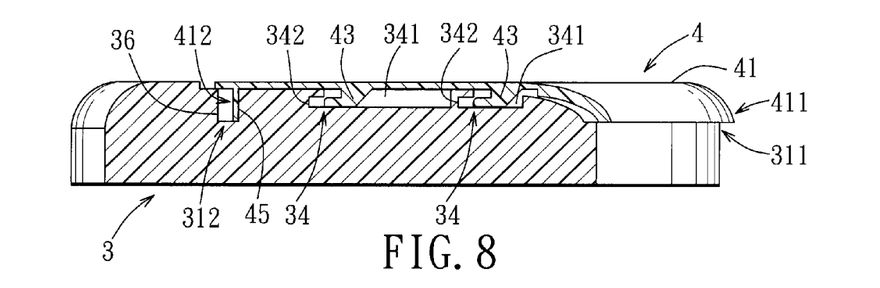
FIG. 8 is a schematic sectional view of the preferred embodiment of the housing for an electronic device according to this invention, illustrating engaging hooks of the cover respectively located in alignment groove portions of engaging grooves.
Figure 10:
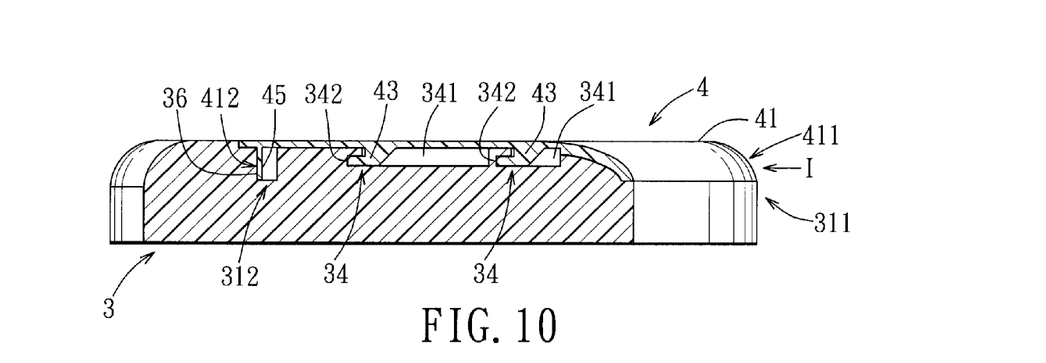
FIG. 10 is a schematic sectional view of the preferred embodiment of the housing for an electronic device according to this invention, illustrating the engaging hooks of the cover respectively engaged in retaining groove portions of the engaging grooves.
Figure 11:
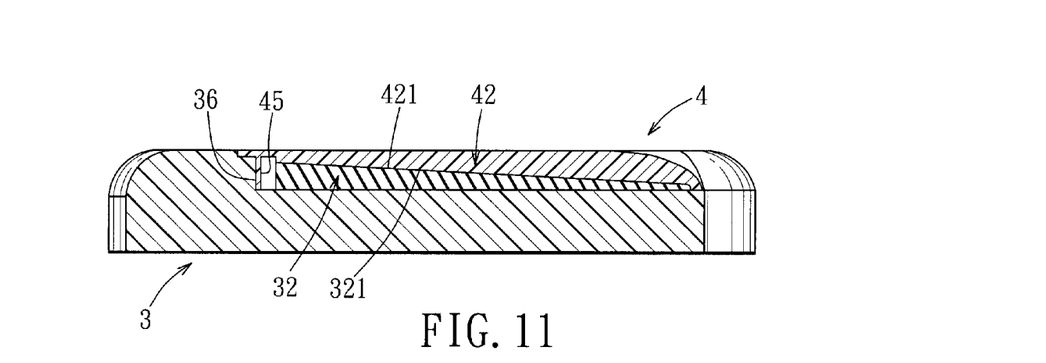
FIG. 11 is a schematic sectional view of the preferred embodiment of the housing for an electronic device according to this invention, illustrating the second inclined surface of the second surrounding wall in complete tight engagement with the first inclined surface of the first surrounding wall.

As shown in FIGS. 8 and 9, when it is desired to assemble the cover 4 to the housing body 3, the engaging hooks 43 of the cover 4 are respectively aligned with alignment groove portions 341 of the engaging grooves 34 in the housing body 3 which are disposed proximate to the first end 311, and the engaging hooks 43 are then respectively inserted into the alignment groove portions 341 of the engaging grooves 34. At this time, apart of the second inclined surface 421 of the second surrounding wall 42 of the cover 4 is in contact with the first inclined surface 321 of the first surrounding wall 32 of the housing body 3. Subsequently, referring to FIGS. 10, 11 and 12, the cover 4 is pushed from the first end 311 of the base wall 31 toward the second end 312 of the base wall 31 along an assembling direction (I) so that the second inclined surface 421 of the cover 4 is slid along the first inclined surface 321 of the housing body 3. When the cover 4 is slid relative to the housing body 3 to a point where a baffle 45 disposed proximate to the second end 412 abuts against a limiting portion 36 of the housing body 3, the cover 4 can not be slid relative to the housing body 3 any further. At this time, the engaging hooks 43 of the cover 4 are respectively retained in retaining groove portions 342 of the engaging grooves 34 which are disposed proximate to the second end 312, a passage hole 44 in the cover 4 is aligned with a through hole 35 in the housing body 3, and the second inclined surface 421 of the second surrounding wall 42 is tightly and completely engaged with the first inclined surface 321 of the first surrounding wall 32, so that the second surrounding wall 42 and the first surrounding wall 32 cooperatively define an airtight space 33 for receiving a battery 6 therein (as best shown in FIG. 6). The airtight space 33 is in a sealed state so as to achieve a water-proof effect. Subsequently, a post 51 of the locking member 5 is extended through the passage hole 44 and the through hole 35, and an operating portion 52 of the locking member 5 is rotated along a direction indicated by an arrow (II) (see FIG. 12), so that two engaging portions 53 on an outer surface of the post 51 of the locking member 5 engage an inner wall surface of the housing body 3, thereby locking the cover 4 to the housing body 3.

Figure 12:
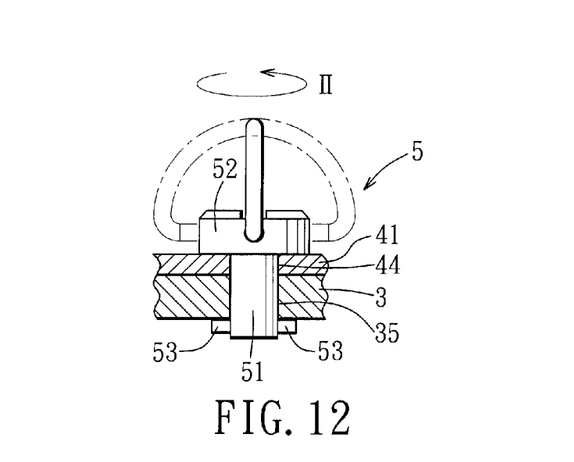
FIG. 12 is a schematic sectional view of the preferred embodiment of the housing for an electronic device according to this invention, illustrating engaging portions of a locking member in engagement with an inner wall of a housing body.

Additionally, when it is desired to disassemble the cover 4 from the housing body 3, the operating portion 52 of the locking member 5 is rotated along a direction opposite to the direction indicated by the arrow (II) so as to move the engaging portions 53 of the locking member 5 away from the engaging position at the inner wall surface of the housing body 3. At this time, the locking member 5 can be taken out through the through hole 35 in the housing body 3 and the passage hole 44 in the cover 4. Subsequently, the cover 4 is pushed along a direction opposite to the assembling direction (I) so that the engaging hooks 43 of the cover 4 are disengaged from the retaining groove portions 342 of the engaging grooves 34 and are moved to the alignment groove portions 341. The cover 4 can then be disassembled from the housing body 3.

By virtue of the configurations of the first inclined surface 321 of the first surrounding wall 32 and the second inclined surface 421 of the second surrounding wall 42, and by virtue of the arrangements of the engaging grooves 34 in the outer periphery of the first surrounding wall 32, the engaging hooks 43 at the outer periphery of the second surrounding wall 42, and the locking member 5, the cover 4 can be assembled to the housing body 3 through a sliding engagement. Furthermore, the first inclined surface 321 of the first surrounding wall 32 and the second inclined surface 421 of the second surrounding wall 42 can be tightly engaged with each other to attain a good water-proof effect. Therefore, the problems associated with the prior art in which the battery cover 12 can not be slid easily or can not be slid at all due to the friction force produced between the battery cover 12 (see FIG. 2) and the water-proof rubber 112 (see FIG. 2) can be overcome.

It is worth mentioning that, in practical application, the invention may be modified to have only the second surrounding wall 42 configured as a water-proof component that is made of a material such as rubber, silicone, thermoplastic elastomer, or thermosetting elastomer, or to have both of the first and second surrounding walls 32, 42 configured as water-proof components made of a material such as rubber, silicone, thermoplastic elastomer, or thermosetting elastomer, and is not limited to the disclosure of this embodiment in which the first surrounding wall 32 is configured as a water-proof component.

In sum, in this embodiment, by virtue of the configurations of the first inclined surface 321 of the first surrounding wall 32 and the second inclined surface 421 of the second surrounding wall 42, and by virtue of the arrangements of the engaging grooves 34 in the outer periphery of the first surrounding wall 32, the engaging hooks 43 at the outer periphery of the second surrounding wall 42, and the locking member 5, the cover 4 can be assembled to the housing body 3 through a sliding engagement. Furthermore, the first inclined surface 321 of the first surrounding wall 32 and the second inclined surface 421 of the second surrounding wall 42 can be tightly engaged with each other to attain a good water-proof effect.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements. In addition, it should be readily appreciated that any of the embodiments as described herein or any of the claims as appended hereto does not necessarily have to achieve all of the objects, advantages or features disclosed herein. Moreover, the title of the invention and the abstract of disclosure are provided herein to allow a searcher to quickly ascertain the subject matter of the technical disclosure of any patent issued on this application, and should not be relied upon to limit the scope of protection sought for this invention.

We claim:

1. A housing for an electronic device, comprising:
   a housing body including a base wall and a first surrounding wall projecting from said base wall, said first surrounding wall having a first end face that is a first inclined surface of a surrounding shape; and
   a cover covering said housing body, and including a cover plate and a second surrounding wall projecting from said cover plate, said second surrounding wall having a second end face that is a second inclined surface of said surrounding shape in tight engagement with said first inclined surface so that said second surrounding wall and said first surrounding wall cooperatively define an airtight space, at least one of said first and second surrounding walls being a water-proof component made of an elastic material,
   wherein said housing body further includes a plurality of engaging grooves disposed in an outer periphery of said first surrounding wall, said cover further including a plurality of engaging hooks disposed at an outer periphery of said second surrounding wall for engaging said engaging grooves, respectively, and
   wherein each of said plurality of engaging grooves is elongated in shape, and includes an alignment groove portion for aligning with a corresponding one of said plurality of engaging hooks, and a retaining groove portion for retaining the corresponding one of said plurality of engaging hooks.

2. The housing for an electronic device as claimed in claim 1, wherein said cover is slidable relative to said housing body along an assembling direction so as to be coupled to said housing body such that said second inclined surface and said first inclined surface are tightly engaged with each other.

3. The housing for an electronic device as claimed in claim 1, wherein said base wall has a first end and a second end opposite to said first end, said first inclined surface extending from a point proximate to said first end to a point proximate to said second end to slant gradually away from said base wall, said cover plate having a first end and a second end respectively corresponding in position to said first end and said second end of said base wall, said second inclined surface extending from a point proximate to said second end of said cover plate to a point proximate to said first end of said cover plate to slant gradually away from said cover plate.

4. The housing for an electronic device as claimed in claim 3, wherein the alignment groove portion is proximate to said first end of said base wall, and the retaining groove portion is proximate to said second end of said base wall.

5. The housing for an electronic device as claimed in claim 4, wherein said housing body further includes a through hole, said cover further including a passage hole corresponding in position to said through hole, said housing further comprising a locking member extending through said through hole and said passage hole so as to lock said cover to said housing body.

6. The housing for an electronic device as claimed in claim 1, wherein said first surrounding wall is a water-proof component, and is made of a material selected from the group consisting of rubber, silicone, thermoplastic elastomer, and thermosetting elastomer.

7. The housing for an electronic device as claimed in claim 1, wherein said second surrounding wall is a water-proof component, and is made of a material selected from the group consisting of rubber, silicone, thermoplastic elastomer, and thermosetting elastomer.

8. The housing for an electronic device as claimed in claim 1, wherein said first and second surrounding walls are water-proof components, and are made of a material selected from the group consisting of rubber, silicone, thermoplastic elastomer, and thermosetting elastomer.

9. The housing for an electronic device as claimed in claim 1, wherein said housing body further includes a through hole, said cover further including a passage hole corresponding in position to said through hole, said housing further comprising a locking member extending through said through hole and said passage hole so as to lock said cover to said housing body.

10. A housing for an electronic device, comprising:
    a housing body including a base wall and a first surrounding wall projecting from said base wall, said first surrounding wall having a first end face that is a first inclined surface of a surrounding shape; and
    a cover covering said housing body, and including a cover plate and a second surrounding wall projecting from said cover plate, said second surrounding wall having a second end face that is a second inclined surface of said surrounding shape in tight engagement with said first inclined surface so that said second surrounding wall and said first surrounding wall cooperatively define an airtight space, at least one of said first and second surrounding walls being a water-proof component made of an elastic material,
    wherein said base wall has a first end and a second end opposite to said first end, said first inclined surface extending from a point proximate to said first end to a point proximate to said second end to slant gradually away from said base wall, said cover plate having a first end and a second end respectively corresponding in position to said first end and said second end of said base wall, said second inclined surface extending from a point proximate to said second end of said cover plate to a point proximate to said first end of said cover plate to slant gradually away from said cover plate, and
    wherein said cover is slidable from said first end of said base wall toward said second end of said base wall along an assembling direction so as to be coupled to said housing body.

11. The housing for an electronic device as claimed in claim 10, wherein said housing body further includes a plurality of engaging grooves disposed in an outer periphery of said first surrounding wall, said cover further including a plurality of engaging hooks disposed at an outer periphery of said second surrounding wall for engaging said plurality of engaging grooves, respectively.

12. The housing for an electronic device as claimed in claim 11, wherein each of said engaging grooves is elongate in shape, and includes an alignment groove portion proximate to said first end of said base wall for aligning with a corresponding one of said plurality of engaging hooks, and a retaining groove portion proximate to said second end of said base wall for retaining the corresponding one of said plurality of engaging hooks.

13. The housing for an electronic device as claimed in claim 12, wherein said housing body further includes a through hole, said cover further including a passage hole corresponding in position to said through hole, said housing further comprising a locking member extending through said through hole and said passage hole so as to lock said cover to said housing body.

14. A housing for an electronic device comprising:
- a housing body including a base wall and a first surrounding wall projecting from said base wall, said first surrounding wall having a first end face that is a first inclined surface of a surrounding shape; and
- a cover covering said housing body, and including a cover plate and a second surrounding wall projecting from said cover plate, said second surrounding wall having a second end face that is a second inclined surface of said surrounding shape in tight engagement with said first inclined surface so that said second surrounding wall and said first surrounding wall cooperatively define an airtight space, at least one of said first and second surrounding walls being a water-proof component made of an elastic material,
- wherein said cover is slidable relative to said housing body along an assembling direction so as to be coupled to said housing body such that said second inclined surface and said first inclined surface are tightly engaged with each other,
- wherein said housing body further includes a plurality of engaging grooves disposed in an outer periphery of said first surrounding wall, said cover further including a plurality of engaging hooks disposed at an outer periphery of said second surrounding wall for engaging said plurality of engaging grooves, respectively, and
- wherein each of said plurality of engaging grooves is elongate in shape, and includes an alignment groove portion for aligning with a corresponding one of said plurality of engaging hooks, and a retaining groove portion for retaining the corresponding one of said plurality of engaging hooks.

15. The housing for an electronic device as claimed in claim 14, wherein said housing body further includes a through hole, said cover further including a passage hole corresponding in position to said through hole, said housing further comprising a locking member extending through said through hole and said passage hole so as to lock said cover to said housing body.

* * * * *